UNITED STATES PATENT OFFICE.

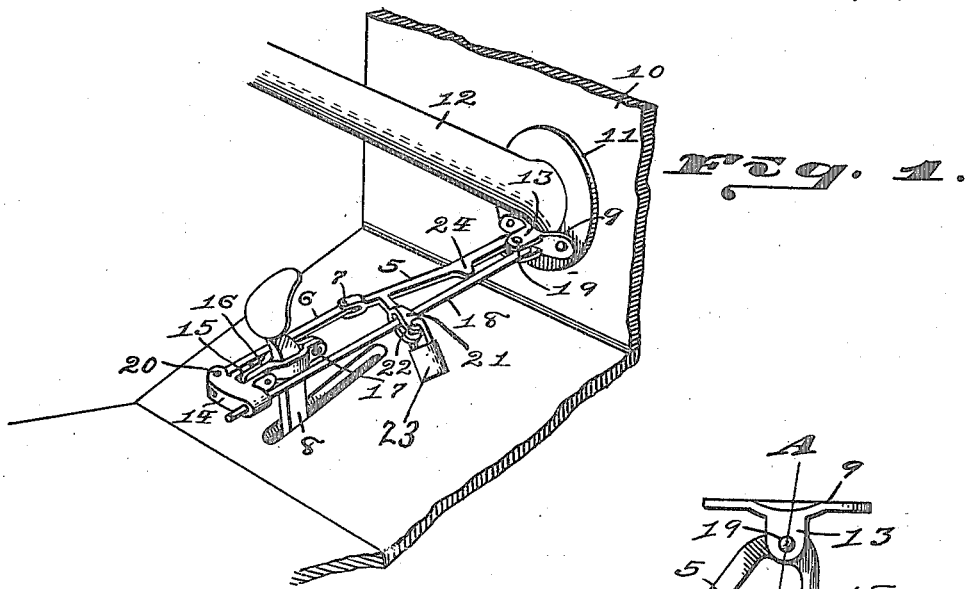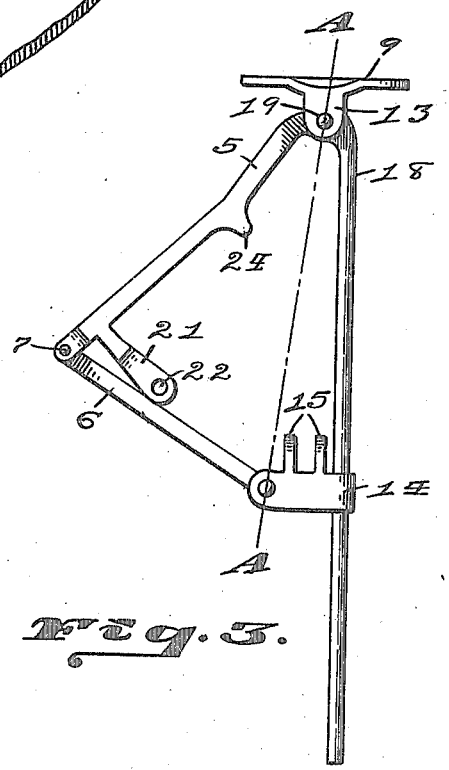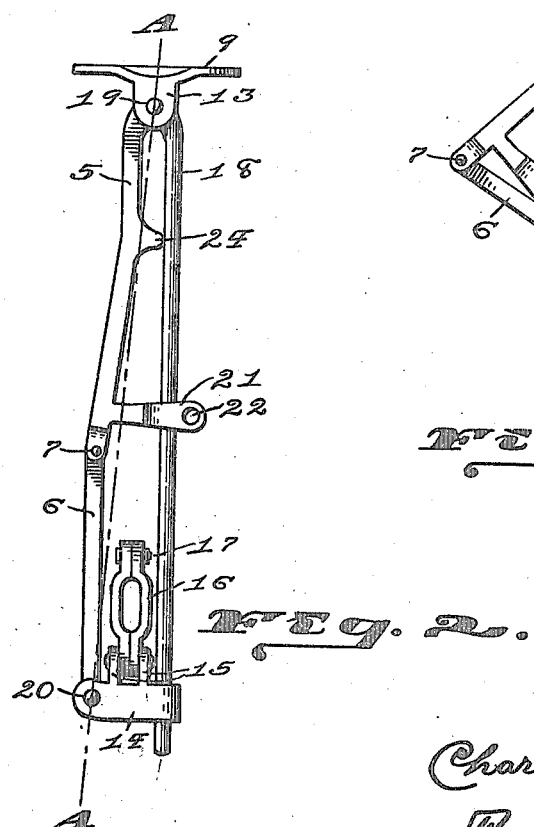

CHARLES E. COOP, OF OKLAHOMA, OKLAHOMA.

LOCK FOR AUTOMOBILES.

1,190,518.  Specification of Letters Patent.  Patented July 11, 1916.

Application filed March 24, 1916. Serial No. 86,509.

*To all whom it may concern:*

Be it known that I, CHARLES E. COOP, a citizen of the United States, and a resident of Oklahoma city, in the county of Oklahoma and State of Oklahoma, have invented certain new and useful Improvements in Locks for Automobiles, of which the following is a specification, reference being had to the accompanying drawings.

An object of the invention is to provide a cheap, simple, and convenient device for locking the lever of an automobile.

The accompanying drawings show one embodiment of the invention in practical form.

Figure 1 is a fragmental perspective view showing the body and foot lever of an automobile, and showing the device set in locking position. Fig. 2 is a plan view of the device with its parts in locking position, the pad-lock being omitted. Fig. 3 is a view similar to Fig. 2, but with the parts in unlocked position and with a certain lever-embracing clamp also omitted.

Referring to the several figures, in all of which like characters of reference designate like parts, the device includes two links 5 and 6 which are pivoted together at the point 7 and adapted to be held in the form of a substantially straight and rigid brace to hold the lever 8 against movement with respect to the body of the vehicle. To pivot one end of this brace to the body of the vehicle, a plate 9 may be supported by the front-board 10 of said body, and in this instance said plate is bolted to the lower portion of the base 11 of the steering column 12. This plate 9 has two lugs 13 between which the front end of the link 5 is pivoted. The rear end of the link 6 is pivoted to a block 14 which is in turn connected in any suitable manner to the lever 8. For connecting this block 14 to the lever 8, its two lugs 15 pivotally straddle the rear end of a two-part clamp 16 which embraces said lever, and the front end of this clamp is held together by a bolt 17.

To hold the two links 5 and 6 in the form of a rigid brace for locking the lever 8, a straight rod 18 is pivoted to the plate 9 and the block 14 is arranged to slide on said rod.

As the lever 8 is swung rearward to the inoperative position shown in Fig. 1, the two links 5 and 6 are drawn into locking position toward the rod 18 with their pivotal point 7 nearly to a dead-center line A—A which passes through the pivotal point 19 of the plate 9 and the pivotal point 20 of the block 14; a bifurcated lug 21 on one of the links, 5, straddling said rod and having eyes 22 through which the shackle of a pad-lock 23 may be passed to lock said lug to said rod.

The link 5 is provided with a projection 24 which abuts the rod 18 and limits the movement of the pivotal point 7 of the links 5 and 6 toward the dead-center line A—A, and by holding said point 7 a little off said line the links will not fail to open outward away from the rod after the pad-lock 23 is removed and a forward thrust directed against the lever 8.

Having thus described the invention, I claim:—

1. In a device of the class described, a support, a straight rod pivoted to the support, a block mounted slidably on the rod and adapted to be attached to a lever, a brace having one of its ends pivoted to the support and its other end to the block, said brace having a pivot joint intermediate its ends whereby it may be swung from bracing position and allow movement of the block on the rod, and means for limiting the movement of said pivot joint toward the rod.

2. In a device of the class described, a support, a straight rod pivoted to the support, a block mounted slidably on the rod and adapted to be attached to a lever, a brace having one of its ends pivoted to the support and its other end to the block, said brace comprising two link members engaging each other by a pivot joint, one of the link members having a projection adapted to abut the rod and thereby limit the movement of the pivot joint of said link members toward said rod.

3. In a device of the class described, a support, a straight rod pivoted to the support, a block mounted slidably on the rod and adapted to be attached to a lever, a brace having one of its ends pivoted to the support and its other end to the block, said brace comprising two link members engaging each other by a pivot joint, one of the link members having a bifurcated lug adapted to straddle the rod, and having a projection adapted to abut the rod to limit the movement of the pivot joint of said link members toward said rod.

Witness my hand this 20 day of March, 1916.

CHARLES E. COOP.